United States Patent [19]
Rice

[11] 3,720,967
[45] March 20, 1973

[54] BOAT TRAILER

[76] Inventor: Henry T. M. Rice, 1213 Ramona Street, San Gabriel, Calif.

[22] Filed: Feb. 16, 1971

[21] Appl. No.: 115,295

[52] U.S. Cl. .................................9/1 T, 280/414 R
[51] Int. Cl. ..............................................B63c 13/00
[58] Field of Search.......9/1 R, 1 T; 114/0.5 R, 0.5 F, 114/43.5, 61; 280/414 R; 214/505, 506, 500, 84; 115/1 R, 1 A

[56] References Cited

UNITED STATES PATENTS

| | | | |
|---|---|---|---|
| 3,608,754 | 9/1971 | Park | 9/1 T |
| 2,361,951 | 11/1944 | Livermon | 9/1 T |
| 3,434,166 | 3/1969 | Clymer | 9/1 T |
| 3,124,259 | 3/1964 | Goettl | 9/1 T |

*Primary Examiner*—Milton Buchler
*Assistant Examiner*—Sherman D. Basinger
*Attorney*—Bernard Kriegel and Kendrick, Subw & Kriegel

[57] ABSTRACT

A boat trailer including a trailer frame carrying a float member thereabove and movable vertically relative thereto, a boat being guided by the float member from and onto the trailer. When the trailer is disposed in the water, its frame drops vertically relative to the float member to an extent limited by the float member, enabling the boat to back off freely from the trailer under its own power, as well as move forwardly over the trailer to a position to be supported by the trailer when it is pulled fully onto dry land by a towing vehicle.

14 Claims, 9 Drawing Figures

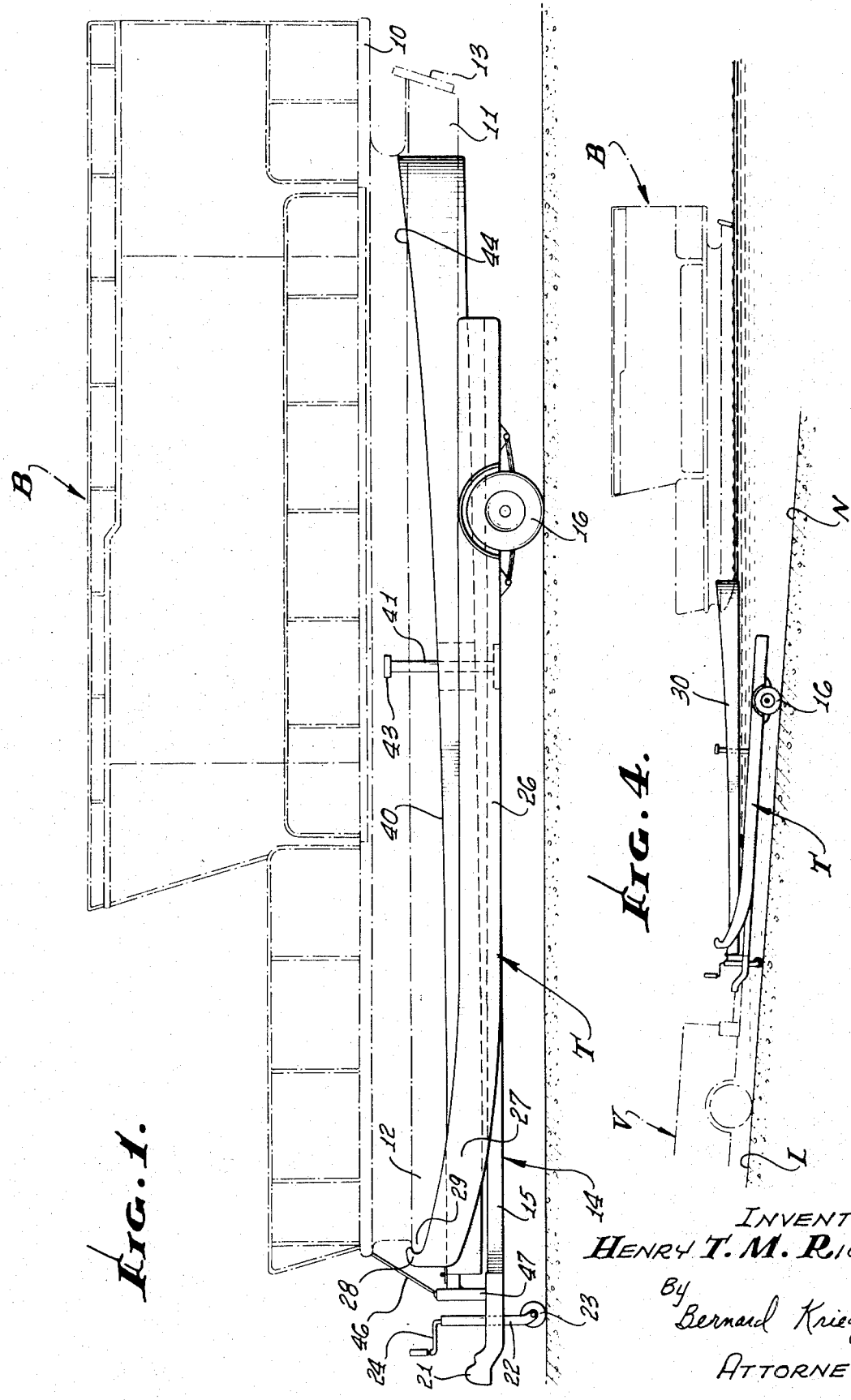

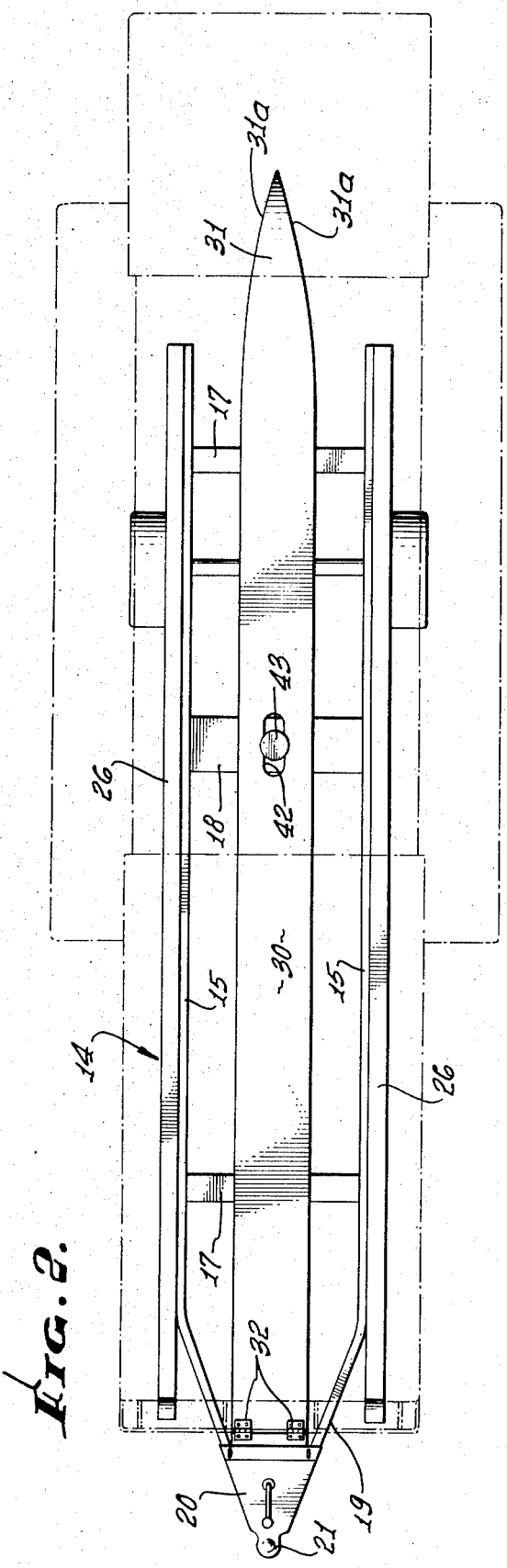
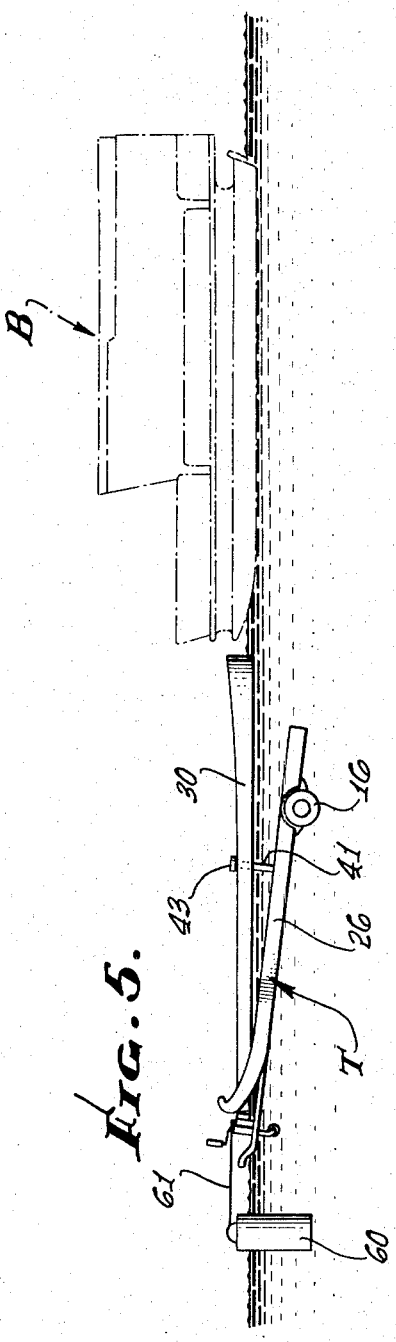

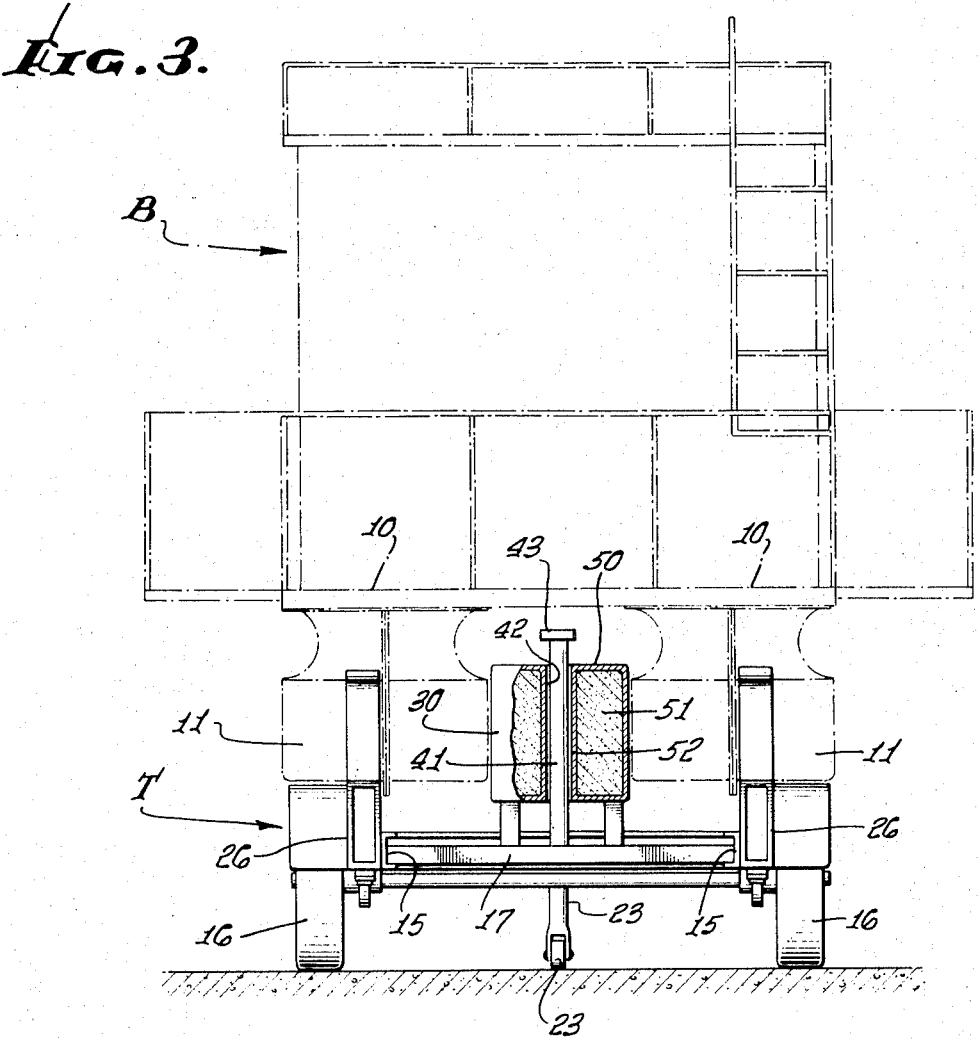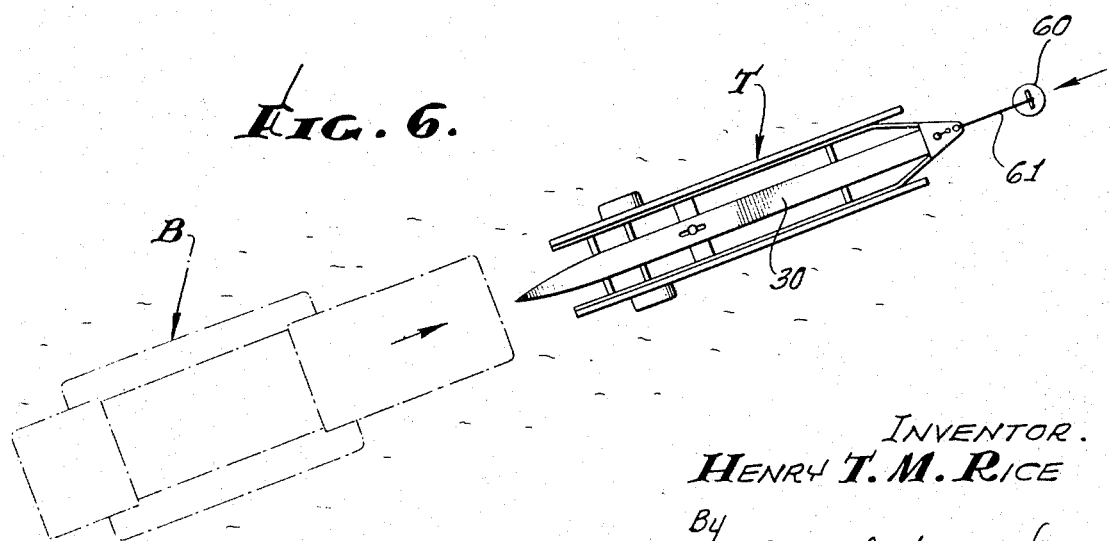

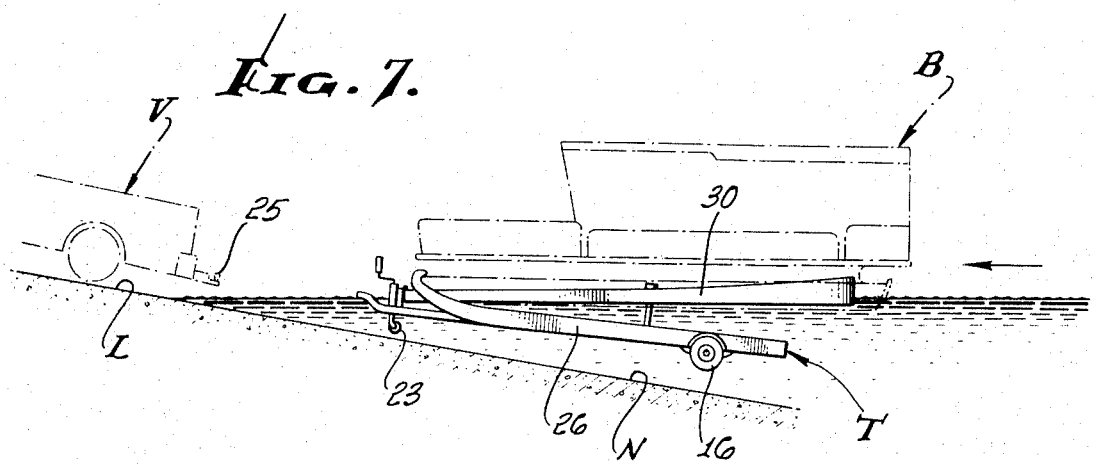
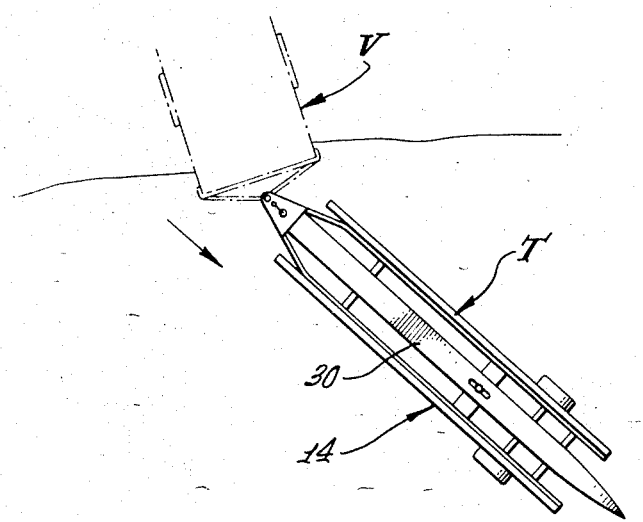
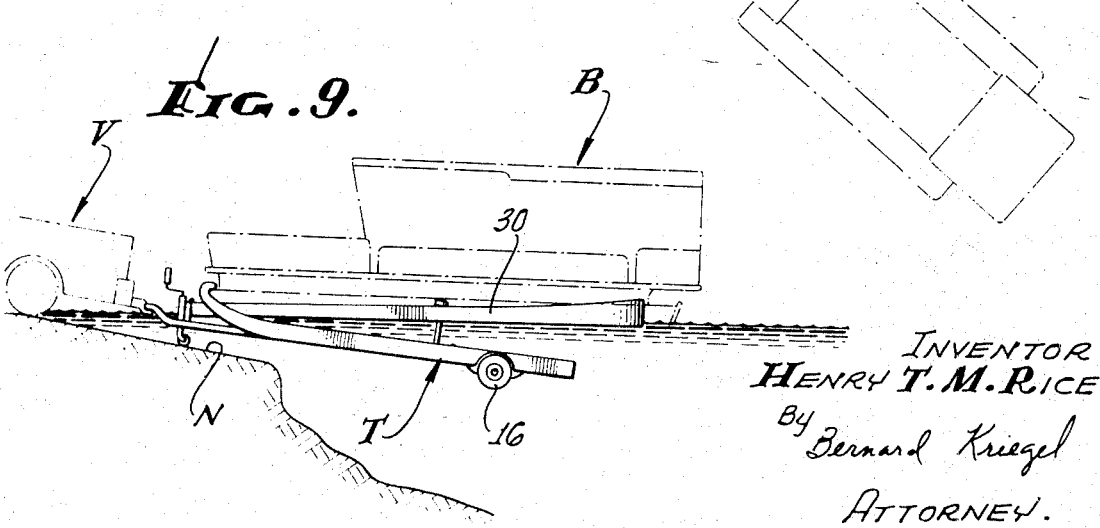

BOAT TRAILER

The present invention relates to trailers, and more particularly to trailers adapted to convey boats to and from launching sites.

Heretofore, it has been difficult to load and unload boats from and onto trailers at a launching site. Substantial manual force was required in moving the boat from the trailer into the water and in replacing the boat on the trailer. This difficulty is enhanced where the floor of the body of water drops away precipitously at the water edge, since there has been no way of supporting the rear portion of the trailer as it is backed by the towing vehicle into the water. After the boat has been removed from the trailer, the trailer, as a rule, has remained with the towing vehicle. It then becomes necessary for the operator of the boat to return it to the site from which it has been launched. The replacing of the boat over the trailer has also involved difficulties due to the action of a cross wind, which tends to swing the boat out of an aligned position with the trailer.

By virtue of the present invention, a boat trailer is provided which includes a member capable of floating in water with at least a substantial portion thereof projecting above the surface of the water, and with respect to which the trailer frame will drop away when the trailer with the float member is in the water, the floating member being capable of acting as a guide assisting in aligning the boat with the trailer when the boat is to be moved back onto the trailer, preparatory to securing it to the latter. The floating guide member also coacts with the boat to prevent relative lateral movement of the boat when mounted on the trailer. The boat and trailer combination can, if desired, be moved as a unit under the power of the boat itself to an offshore location, whereupon the trailer can be anchored at such location in such manner that it will always head downwind, permitting the boat to be moved readily in the water directly upwind and in proper alignment with the trailer to its desired final position over the trailer The same action will occur when the trailer is located at a launching or retrieval site, provided the rear wheels of the trailer are out of contact with the subaqueous bottom. The trailer can swing freely about its front portion, automatically disposing itself in a downwind direction, whereupon the boat can be driven directly upwind and onto the trailer without the trailer position presenting significant side drift problems to the boat.

By virtue of the present invention, trailers have been provided in which the float member supports the trailer frame in the water, enabling the trailer with the boat disposed thereover and secured thereto to act as a power source for moving both the trailer and the boat through the water to any desired destination. Moreover, the boat can be used for driving the trailer onto the shore to a sufficient extent, enabling a person to step onto dry land, as for the purpose of attaching the trailer to an automobile, or other towing vehicle. The reverse is also true, since the automobile can back the trailer and boat carried thereby partially into the water to a position in which the boat propeller or propellers are in the water. Upon detaching the trailer hitch from the automobile, the power mechanism of the boat can be placed in reverse, causing the propellers to pull the boat and trailer attached thereto fully into the water.

By virtue of the present invention, the boat is readily secured to the trailer, with the boat being prevented from moving laterally relative to the trailer, the boat also being prevented from moving vertically relative to the trailer, as, for example, in traversing rough or bumpy roads while the trailer and boat combination are being towed by an automobile. Such relative vertical motion could induce boat damage, trailer damage, or both.

A further objective of the invention is to provide a trailer for catamaran boats in which the trailer has a floating guide therein straddled by the hulls or pontoons of the catamaran when the latter is mounted on the trailer, the floating guide member allowing the trailer frame to drop downwardly when the trailer and boat combination are backed into the water, thereby freeing the catamaran from the trailer. In a more limited sense, the float is elongate, with its upper portion always projecting above the surface of water, thereby functioning as a guide for remounting the boat with respect to the trailer since the pontoons of the catamaran will straddle and closely confine the float member during movement of the boat over the float and trailer frame depending from the float.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a side elevational view of a boat trailer embodying the invention, with a catamaran type of boat mounted thereon;

FIG. 2 is a top plan view of the boat trailer illustrated in FIG. 1;

FIG. 3 is a rear end view of the trailer, on an enlarged scale, as seen from the right ends of FIGS. 1 and 2, and with a catamaran disposed thereon, a portion being broken away and in secton;

FIG. 4 is a side view of a towing vehicle, trailer and boat disposed in a relative position for launching the boat from the trailer, or for driving the boat back over the trailer;

FIG. 5 is a side elevational view illustrating the trailer in the water moored to a buoy, and with the boat in position for movement back over the trailer, or in its position after having been removed from the trailer;

FIG. 6 is a top plan view illustrating the mode of driving the boat back over the trailer anchored in the water;

FIG. 7 is a side view illustrating the manner of using the boat power for moving the boat and trailer combination back toward the beach for reconnection of the trailer to a towing vehicle;

FIG. 8 is a top plan view illustrating the mode of moving the boat back over the trailer hitched to a towing vehicle, the trailer being capable of movement by the wind;

FIG. 9 is a side elevational view illustrating the boat over a trailer and connected thereto, the trailer being secured to the towing vehicle, the rear wheels of the trailer being out of contact with the subaqueous bottom.

The boat trailer T illustrated in the drawings has been specifically designed for use in connection with a catamaran boat B of any suitable construction. This boat has the usual deck 10 from which depend laterally spaced, parallel elongate floatable pontoons or hulls 11, the forward portions 12 of which taper in a forward and upward direction. The rear of each pontoon has a transom 13 for mounting an outboard motor (not shown).

The boat trailer includes a chassis 14 having spaced side members 15 suitably spring supporting a set of rear trailer road engaging wheels 16, the side members being interconnected by cross members 17, 18. The forward portion 19 of the trailer chassis 14 tapers and is secured to a trailer hitch 20, including the usual socket member 21. This forward portion has a vertical frame member or jack 22 carrying a central ground engaging front wheel 23. By turning a suitable crank 24, the forward portion of the chassis can be raised or lowered to facilitate disconnection and reconnection of the hitch socket 21 from and onto the usual ball portion 25 of the trailer hitch fastened to the frame of the towing vehicle V (see FIG. 7).

Attached to the chassis side members 15 are side rails 26 projecting above the chassis frame, and on which the boat pontoons 11 are adapted to come to rest. The forward portion 27 of each side rail is inclined in an upward direction to conform to the extent of inclination 12 of the boat pontoon. Each forward portion terminates in an upper hook 28 adapted to receive and overlie the prow 29 of the boat pontoon, the hook acting as a stop limiting forward movement of the boat along the trailer, the overlying hook engaging the prow to prevent upward movement of the pontoon 11 and the boat B relative to the frame 14, 26 when the pontoons are resting on the side members 26.

For the purpose of supporting the trailer chassis 14 in the water, an elongate float member 30 is disposed over the cross members 17, 18 from the forward portion of the chassis to its rearward portion. In fact, the rear portion 31 of the float may extend beyond the rear end of the chassis 14 and the side rails 26. The forward upper portion of the float member 30 is secured to the forward portion of the chassis by one or more hinges 32, the float member, when out of the water, resting upon the cross members 17, 18. The float member 30 has a width conforming to the lateral distance between the boat pontoons 11, such width being slightly less than the distance between the pontoons to provide clearance. The rearward portion 31 of the float member has its sides 31a tapering toward each other. Accordingly, the float member 30 functions as a guide in steering the catamaran onto the trailer and into a position in which the pontoons 11 overlie the side members or rails 26, the close conformance of the sides of the float member to the inner sides of the pontoons preventing any significant relative lateral shifting of the boat B with respect to the trailer T. If the boat were to head into the trailer at an angle, the tapered sides 31a of the rear portion of the float member would engage the forward portions of a pontoon 11, causing the boat and trailer to shift laterally with respect to each other and bring the pontoons 11 to a position on opposite sides of the float member, disposing the boat centrally of the trailer and in a position for movement fully over the trailer to an extent limited by engagement of the pontoon prows with the forward stop portions 28 of the side rails 26.

When the trailer T is shifted into the water, the chassis 14 and wheels 16 drop downwardly relative to the float member 30, the chassis swinging about the axis of the hinges 32 with the side rails 26 dropping downwardly away from the pontoons 11, which are then floating in the water. The upper surface 40 of the float member is always spaced below the deck 10 of the boat, the boat being movable onto and from the trailer without sliding along such upper surface. The degree of downward dropping of the chassis 14 from the float member 30 is limited by a vertical stop member or rod 41, the lower end of which is secured to a cross member 18 of the chassis, the rod extending through a longitudinal slot 42 in the float member and having a head 43 at its upper end adapted to engage the upper surface 40 of the float member to preclude any further relative downward pivoting of the chassis 14 with respect to the float member.

When the trailer is disposed in the water, the weight of the trailer supported by the limit rod 40 would tend to pull the rear portion 31 of the float member further downwardly in the water. To insure that such rear portion always projects a substantial distance above the surface of the water, it has a greater vertical height, with its upper surface 44 inclined in an upward and rearward direction.

When the boat B is fully mounted on the trailer T, its front end is tied to the latter by suitable means, such as a cable or line 46 secured to a vertical member 47 affixed to the chassis.

The float member 30 may be made of any suitable material. As illustrated in the drawings, it can include an outer casing or shell 50 containing rigid polyurethane 51 (FIG. 3) of an appropriate specific gravity. The shell itself may be a laminated fiberglass structure, the sides 52 of the elongate slot, through which the stop rod 41 extends, also being made of fiberglass. Polyurethane foam can be injected into the shell 50 and will set to a rigid state. The manner of forming a polyurethane foam structure is well known in the synthetic resin art.

Various conditions under which the boat and trailer combination can be used are illustrated in FIGS. 4 to 9, inclusive. As illustrated in FIG. 4, the towing vehicle V has backed the trailer T from a beach L along a downwardly sloping subaqueous bottom N until the trailer is located downwardly away from the float 30, so that the pontoons 11 of the catamaran boat B are free from support by the side rails 26 of the trailer frame. The front cable 46 is disconnected and the catamaran, using its own power, backed off the trailer T without restraint, as to the position illustrated in FIG. 4.

FIG. 4 also illustrates a position for remounting the boat B on the trailer. The boat need merely be steered toward the rear portion 31 of the float with the pontoons 11 disposed on opposite sides of the float member. The boat is moved over the float and the trailer frame until the prows of the pontoons engages the stop members 28, whereupon the cable 46 can be used to reattach the front of the boat to the trailer. The vehicle V can then pull the trailer and boat out of the water, the trailer frame 14, 26 moving upwardly until the side rails 26 reengage the bottoms of the pontoons or hulls, the boat again being supported by the trailer. The towing vehicle V can then convey the trailer and boat to any desired point. As described above, the prows of the pontoons are retained by the hooks 28 to prevent relative vertical movement of the boat relative to the trailer frame. The float member 30 positioned between the pontoons 11 prevents relative lateral movement between the boat and trailer.

If desired, the boat and trailer could be backed by the towing vehicle V into the water and the trailer hitch disconnected, as by turning the crank 24 to jack the socket portion 21 of the hitch off its ball portion 25 affixed to the vehicle. The boat B remains connected to the trailer T through the cable 46. The boat power mechanism can then be used to move the boat and trailer combination into the water. When backed sufficiently from shore, the boat is appropriately steered to bring the boat and trailer assembly to a desired mooring point in the water, as, for example, to a buoy 60 (FIG. 5) suitably anchored in the water. While being moved through the water, the trailer frame 14, 26, of course, will occupy its downward position relative to the float member 30. The forward portion of the trailer frame is secured by a cable 61 to the buoy, and the cable 46 securing the boat to the trailer, disconnected, allowing the boat B to back off the trailer. The boat can then be moved and used in any desired fashion.

When the boat is to be reconnected to the trailer T that is now secured to the buoy 60, it is driven to the location of the trailer. The trailer is free to swing relative to the buoy, the wind shifting the trailer in the water to a position in which it is downwind of the buoy, much in the nature of an airport wind-sock. Accordingly, as illustrated in FIG. 6, the boat can be placed in general alignment with the trailer and driven upwind over the trailer, being guided into its appropriate position by the pontoons 11, which will straddle the float member 30. When the prows of the pontoons engage the stop portions 28 of the side rails 26, the boat can be reconnected by the cable 46 to the trailer, the trailer then being released from the buoy 60 and the boat trailer combination moved to any desired location under the power of the boat, as toward the shore.

If the subaqueous bottom N adjacent to the beach L is gradually sloping, as illustrated in FIG. 7, the boat and trailer combination can be powered by the boat to bring the forward portion of the boat and trailer a substantial distance out of the water. The front wheel 23 rides up the sloping bottom N, as will the rear wheels 16, the trailer frame 14, 26 swinging about the axis of the hinges 32 upwardly toward the float 30 and the pontoons 11. So long as a portion of the boat propeller or propellers is in the water, the boat power is available for moving the trailer and boat up the sloping bottom N and can place the forward portion of the trailer on dry land L. A person can then step from the boat directly onto dry land, whereupon he can drive the vehicle V from its parking site and back it into a position adjacent to the front end of the trailer, the trailer hitch then being reconnected.

The boat and trailer can be launched in the reverse of the manner just described above, since it is unnecessary for the towing vehicle V to back the boat B completely into the water. With the front portion of the trailer and the boat on the beach L, the trailer can be disconnected from the vehicle and a person can then step from dry land onto the trailer and the boat. The power of the boat is sufficient to back the boat and trailer into the water as a unit, if desired, or the boat can be disconnected from the trailer and backed off the trailer into the water.

As illustrated in FIGS. 8 and 9, the boat B can be readily driven over the trailer T without being adversely affected by cross winds. The trailer is illustrated as being coupled to the towing vehicle V, but the water depth adjacent to the beach is too great for the rear trailer wheels 16 to engage the bottom. As a result, the trailer frame 14, 26 has dropped downwardly relative to the float member 30, which is then supporting it in the water. The trailer hitch serves as a pivot point, allowing the wind to swing the trailer in a downward direction, thereby enabling the boat to be placed in alignment with the float member and driven directly upwind and over the trailer, being guided by the float member 30 to insure that the pontoons 11 will be disposed directly above the side rails 26. The engagement of the prows 29 with the hooks 28 enables the boat to be secured by the cable 46 to the trailer, whereupon the towing vehicle V can be operated to pull the trailer and boat combination onto dry land, the front wheel 23 first supporting the trailer and boat, and the rear wheels 16 then engaging the sloping bottom and moving the trailer frame upwardly until the side rails 26 engage the pontoons 11 to support the boat B.

It is, accordingly, apparent that the trailer, when free to swing in the wind, will enable the boat operator to avoid the side drift problems that would be encountered if the trailer T were in such position that cross winds would be acting on the boat when aligned with the trailer. Even if some cross winds are encountered, the engagement of a pontoon 11 with a tapered rear side 31a of the float and the continued forward motion of the boat would still bring the float 30 in between the pontoons 11, and thereby place the boat in full alignment with the trailer for movement thereover until the prows 29 engage the forward stop members 28.

I claim:

1. In a trailer apparatus for carrying a boat: a trailer frame having ground engaging wheels and adapted to support the boat; means buoyant in water and disposed above the trailer frame and having sufficient buoyancy in the water to support the trailer frame in the water in a pendant condition below the buoyant means with the buoyant means projecting above the surface of the water when said wheels are disengaged from the ground, said buoyant means extending substantially from the forward portion to the rear portion of said frame; means interconnecting said trailer frame and buoyant means to allow relative vertical movement between said frame and buoyant means to permit said frame and wheels to drop downwardly of said buoyant means and away from the boat carried by the apparatus when the boat trailer apparatus is in the water to permit substantially free horizontal movement of the boat from and onto the apparatus; said interconnecting means including means connecting the forward portion of said buoyant means to the forward portion of said trailer frame and permitting relative vertical movement between said trailer frame and buoyant means; and stop means on said trailer frame engageable with stop means on said buoyant means rearwardly of said connecting means limiting the extent of downward movement of said trailer frame away from said buoyant means.

2. In apparatus as defined in claim 1; said means connecting the forward portion of said buoyant means to the forward portion of said trailer frame comprising a hinge.

3. In apparatus as defined in claim 1; said buoyant means having sides engageable with side portions of the boat when mounted over said trailer frame to retain said boat against lateral movement relative to said trailer frame.

4. In apparatus as defined in claim 1; said buoyant means including an elongate guide means engaged by side portions of the boat when the boat moves over said buoyant means and trailer frame to guide the boat to a central position along said trailer frame.

5. In apparatus as defined in claim 1; said buoyant means including an elongate guide means engaged by side portions of the boat when the boat moves over said buoyant means and trailer frame to guide the boat to a central position along said trailer frame; said buoyant means having sides engageable with the side portions of the boat when the boat moves over said buoyant means and trailer frame to guide the boat to a central position along said trailer frame.

6. In a trailer apparatus for carrying a boat: a trailer frame having ground engaging wheels and including elongate side members on which the boat is adapted to rest; an elongate member buoyant in water extending above said frame located between said side members, said buoyant member extending substantially from the forward portion to the rear portion of said frame, said buoyant member having sufficient buoyancy in the water to support the trailer frame in the water in a pendant condition below the buoyant member with the buoyant member projecting above the surface of the water; and means interconnecting said trailer frame and buoyant member to allow relative vertical movement between said frame and buoyant member to permit said frame to move downwardly of said buoyant member to withdraw said side members from supporting engagement with the boat.

7. In apparatus as defined in claim 6; said interconnecting means including means connecting the forward portion of said buoyant member to the forward portion of said trailer frame.

8. In apparatus as defined in claim 6; said interconnecting means including hinge means connecting the forward portion of said buoyant member to the forward portion of said trailer frame and permitting relative vertical movement between said trailer frame and buoyant member.

9. In apparatus as defined in claim 6; said interconnecting means including means connecting the forward portion of said buoyant member to the forward portion of said trailer frame; and stop means on said trailer frame engageable with stop means on said buoyant member rearwardly of said connecting means limiting the extent of downward movement of said trailer frame away from said buoyant member.

10. In apparatus as defined in claim 6; said buoyant member being elongate and being disposed between the pontoons of a catamaran type of boat when the pontoons rest on the side members to engage the inner sides of the pontoons and retain the catamaran against substantial movement relative to said trailer frame.

11. In apparatus as defined in claim 6; said buoyant member being elongate and being disposed between the pontoons of a catamaran type of boat when the pontoons rest on the side members to engage the inner sides of the pontoons and retain the catamaran against substantial movement relative to said trailer frame; and stop means on the forward portions of said side members engageable by the forward portions of the pontoons to retain the pontoons on the side members.

12. In apparatus as defined in claim 6; said buoyant member being elongate and being disposed between the pontoons of a catamaran type of boat when the pontoons rest on the side members to engage the inner sides of the pontoons and retain the catamaran against substantial movement relative to said trailer frame; and stop means on the forward portions of said side members engageable by the forward portions of the pontoons; said stop means projecting over the forward portions of the pontoons to prevent relative vertical movement between the trailer frame and forward portions of the pontoons.

13. In apparatus as defined in claim 6; said buoyant member being elongate and being disposed between the pontoons of a catamaran type of boat when the pontoons rest on the side members to engage the inner sides of the pontoons and retain the catamaran against substantial movement relative to said trailer frame; stop means on the forward portions of said side members engageable by the forward portions of the pontoons; said stop means projecting over the forward portions of the pontoons to prevent relative vertical movement between the trailer frame and forward portions of the pontoons; and stop means on said trailer frame engaging stop means on said buoyant member rearwardly of said connecting means limiting the extent of downward movement of said trailer frame away from said buoyant member.

14. In apparatus as defined in claim 1; the rear portion of said buoyant member projecting higher above the surface of the water than the forward portion of said buoyant member.

* * * * *